(12) United States Patent
Cunningham et al.

(10) Patent No.: US 12,109,984 B2
(45) Date of Patent: Oct. 8, 2024

(54) CAR WASH TUNNEL ENTRANCE SAFETY SYSTEM

(71) Applicant: Claire Cunningham, Mission Hills, KS (US)

(72) Inventors: Claire Cunningham, Mission Hills, KS (US); Jason Cunningham, Mission Hills, KS (US)

(73) Assignee: Claire Cunningham, Mission Hills, KS (US)

( * ) Notice: Subject to any disclaimer, the term of this patent is extended or adjusted under 35 U.S.C. 154(b) by 412 days.

(21) Appl. No.: 17/733,279

(22) Filed: Apr. 29, 2022

(65) Prior Publication Data
US 2023/0347851 A1   Nov. 2, 2023

Related U.S. Application Data

(60) Provisional application No. 63/184,588, filed on May 5, 2021.

(51) Int. Cl.
| | |
|---|---|
| B60S 3/06 | (2006.01) |
| B60S 3/00 | (2006.01) |
| G05B 15/02 | (2006.01) |
| G06V 20/40 | (2022.01) |

(52) U.S. Cl.
CPC ............... *B60S 3/066* (2013.01); *B60S 3/004* (2013.01); *G05B 15/02* (2013.01); *G06V 20/44* (2022.01)

(58) Field of Classification Search
CPC ....................................................... B60S 3/066
See application file for complete search history.

(56) References Cited

U.S. PATENT DOCUMENTS

2014/0224279 A1\*  8/2014  Anderson ............... B60S 3/063
                                                                                      134/18

\* cited by examiner

*Primary Examiner* — Jason Y Ko

(57) ABSTRACT

A system to promote car wash safety and protection of car wash assets is provided. The system comprises a server and an application executing on the server. The system receives content from a video camera that captures video of vehicles entering a car wash. The system also performs a first analysis of at least tire alignment of a first vehicle with conveyor equipment. The system also performs a second analysis of characteristics of the first vehicle comprising at least body shape and optional equipment attached to exterior surfaces of the vehicle. The system also determines, based on the analyses, that at least one of a safety issue and a property damage issue is present and at least one of transmits an audible or visual message, transmits an instruction for adjustment of at least one car wash component, and transmits an instruction for full or partial shutdown of the car wash.

20 Claims, 22 Drawing Sheets

FIG. 2, cont.
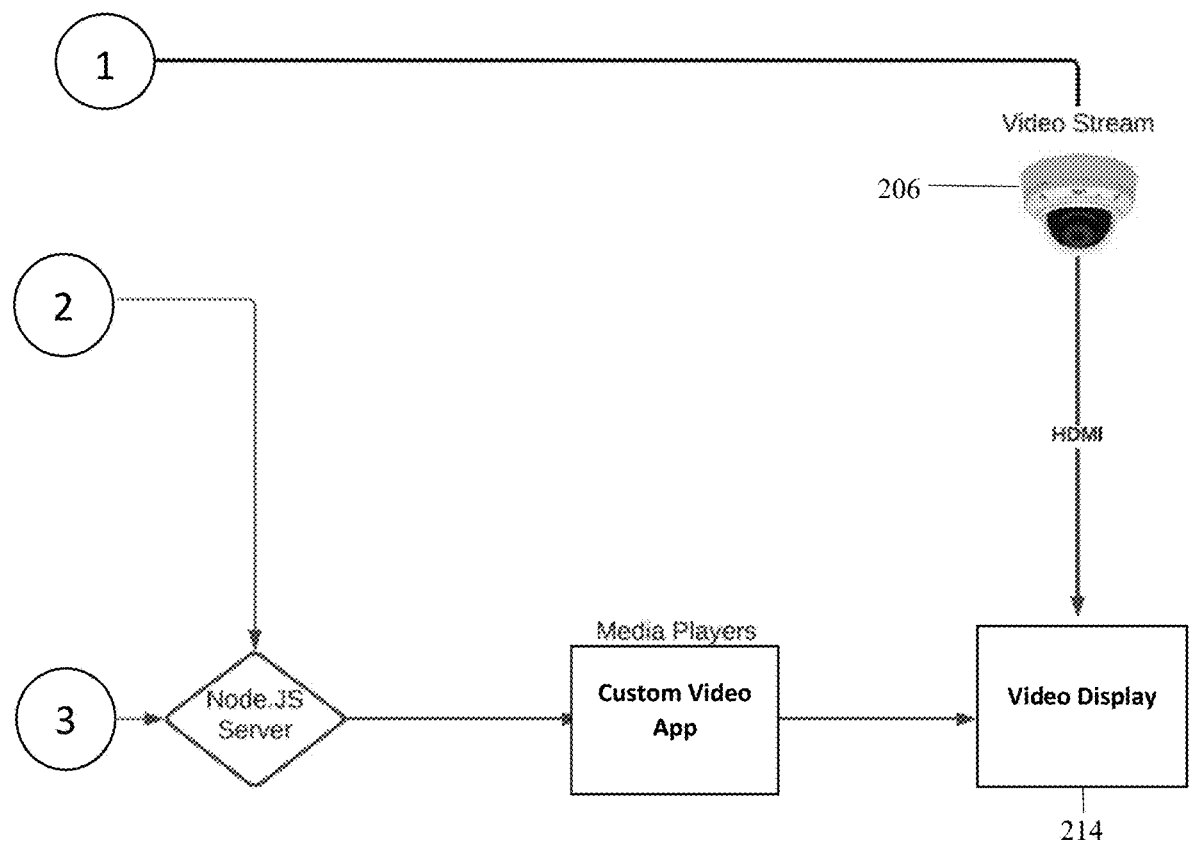

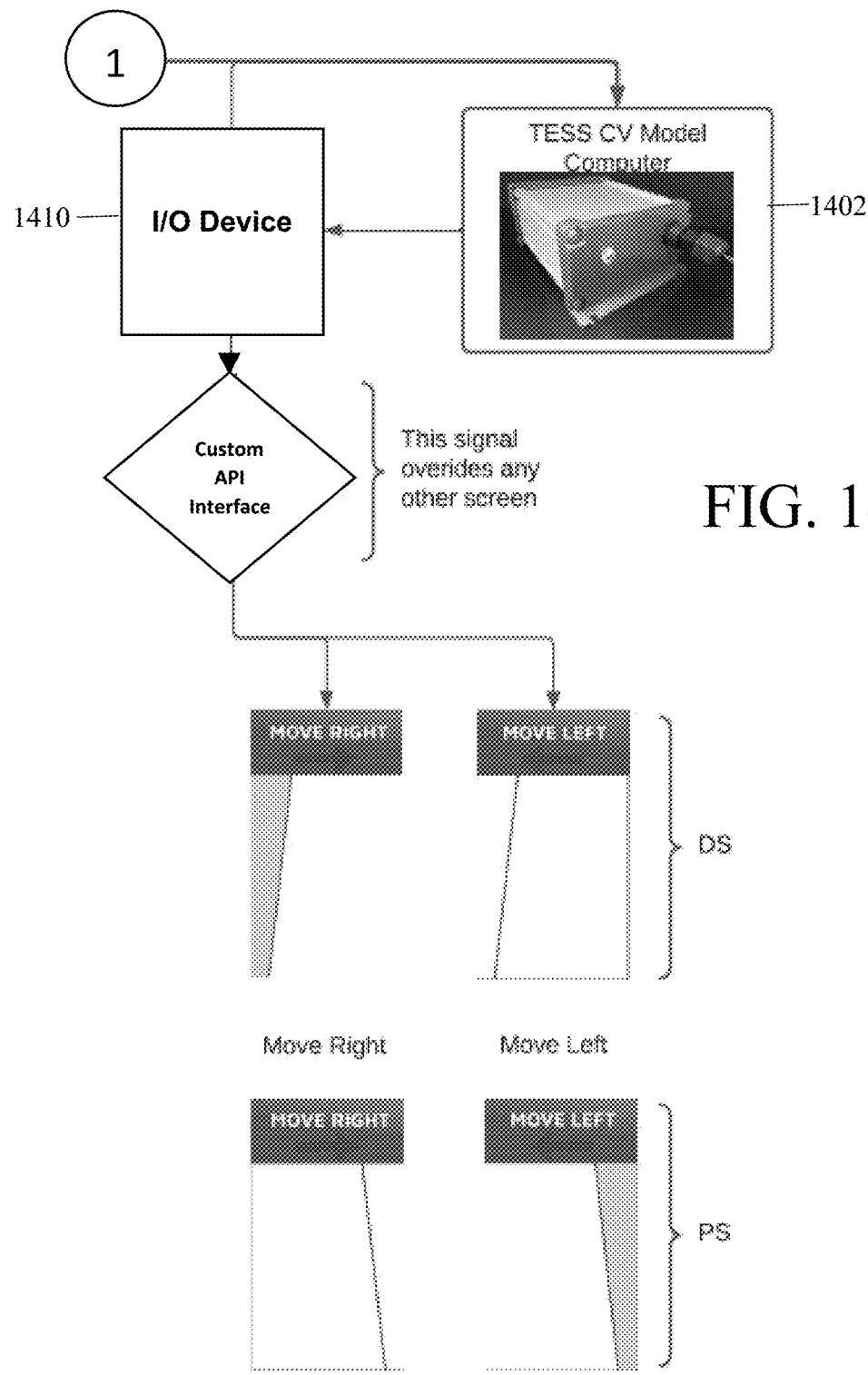
FIG. 14, cont.

CAR WASH TUNNEL ENTRANCE SAFETY SYSTEM

CROSS REFERENCE TO RELATED APPLICATIONS

The present non-provisional patent application is related to U.S. Provisional Application 63/184,588 filed May 4, 2021, the contents of which are incorporated herein in their entirety.

FIELD OF THE DISCLOSURE

The present disclosure is in the field of vehicle care and maintenance. More particularly, the present disclosure provides systems and methods electronically observing vehicles as they enter a car wash, assuring proper vehicle alignment with conveyer equipment, adjusting for optional devices attached to vehicle exteriors, and transmitting warnings and instructions for partial or full shutdown of car wash in the event of safety hazard or risk of car wash equipment or customer vehicle damage.

BACKGROUND

Building and operating a car wash is a very expensive enterprise. A large initial investment in real estate, hardware, access to water and sewage lines, and soft costs including hiring, insurance, planning and permitting is required. Downtime is very expensive. In the present litigious atmosphere, injuries to customers or employees and damage to vehicles present great risks. Minimizing these risks is key to preserving the business and supporting profitability.

An operator of a car wash has a duty to provide reasonable care and make the property safe for customers. This includes providing detailed instructions for how to use the car wash, training employees to answer customer questions and follow safety guidelines, and regularly repairing and updating car wash equipment.

If the car wash owner fails to keep their property safe for customers, they may be exposed to legal liability. If a driver can prove that a car wash operator's negligence led to the driver's vehicle suffering damage, then the driver could file a claim with the operator's insurance to recoup losses.

Operators of car washes may reasonably assure that customers are aware of car wash procedures in a variety of ways. An operator may post clear instructions via signs along the path to the entrance and interior of the carwash. Displayed instructions may be provided, and liability waivers may be signed by customers. Attendants may be trained to communicate instructions directly to patrons. Nevertheless, mishaps still occur, frequently, as a vehicle is entering the car wash.

DETAILED DESCRIPTION

Figure 1:
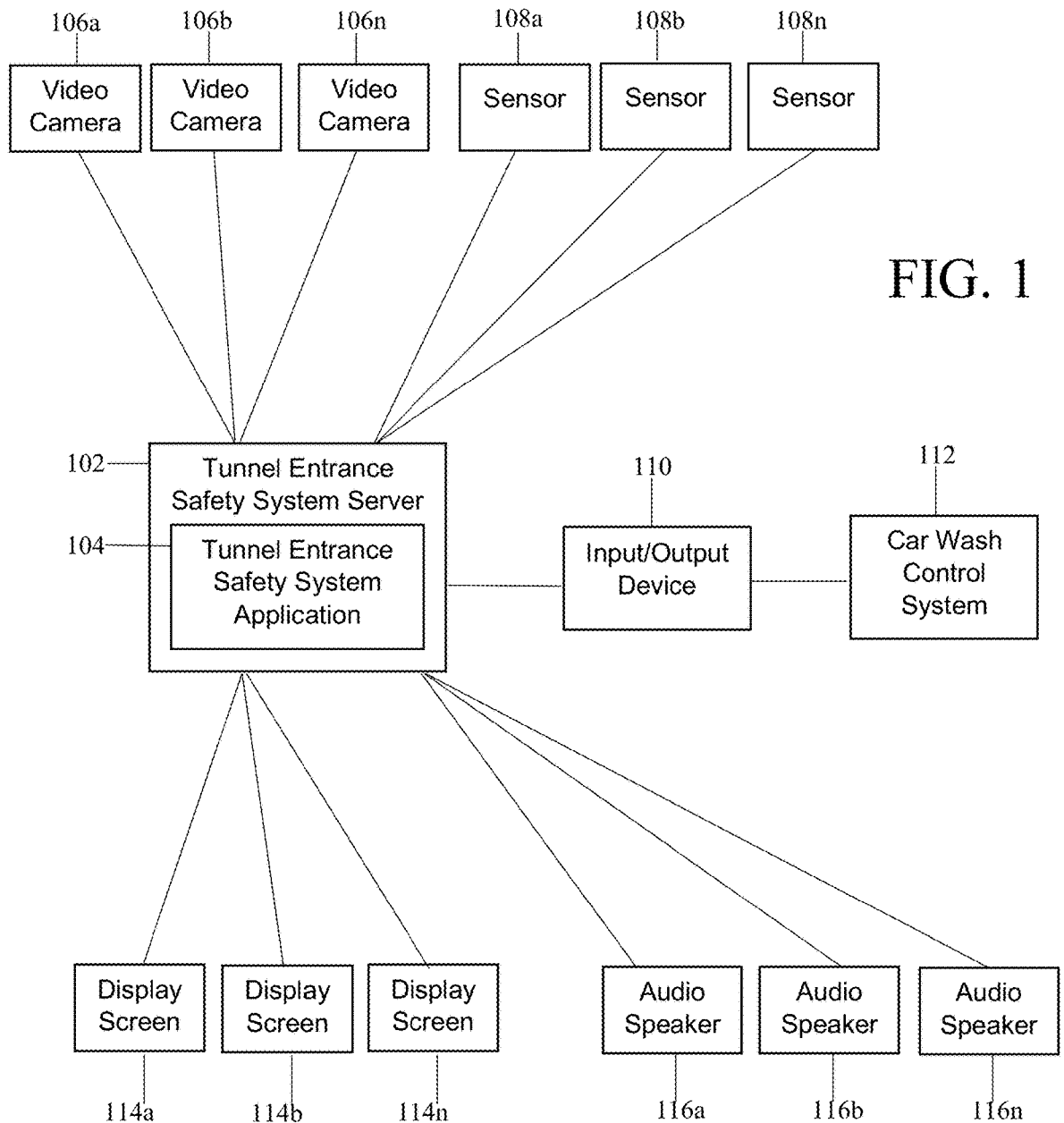
FIG. 1 is a block diagram of a system of car wash tunnel safety according to an embodiment of the present disclosure.

Systems and methods provided herein capture live video of vehicles entering a car wash, observe tire and other vehicle positioning using a combination of at least computer vision technology, Sonar, Radar, Lidar, and other sensors and determine whether the vehicles are properly aligned with car wash conveyor and other components. When misalignment is detected, the system may take various measures ranging from displaying and/or sounding a warning to shutting down the entire car wash.

The system electronically places tolerances or limitations on vehicles entering the car wash that may depend on type of vehicle, the vehicle's size, shape, and estimated weight, and tire dimensions. The tolerances are used in making determinations about potential misalignment and appropriate remedial actions to take.

The system may be referred to commercially as Tunnel Entrance Safety System (TESS), which includes video cameras, signaling equipment, data processing hardware, and at least one software application executing on the hardware. The application handles processing of received data, making of determinations regard misalignment and vehicle irregularities that could present safety hazards or damage to equipment, and transmitting messaging and instructions for adjusting car wash hardware.

In addition to detecting misalignment as vehicles enter a car wash, the system also detects when vehicles have installed externally attached accessories such as bicycle or luggage racks or trailer hitches. The accessories may also include but are not limited to ski racks, front bumper accessories, some rear windshield wipers. Such external accessories could damage car wash equipment. The system detects such extra objects and sends instructions to a car wash control system to shut off, move, or make some other adjustment to car wash components that could be damaged.

The system utilizes computer vision for object detection on vehicles to facilitate alignment and detect conditions of a vehicle that will impact the performance of the car wash equipment. If a trailer hitch is detected, rear wraps of the car wash may be programmed to not engage fully. If a roof rack is detected, the top brush may be retracted automatically. Other objects that may be detected include front bumpers, ski racks, front, rear, and roof bike racks, and rear windshield wipers.

The system may optionally comprise photo eye sensors for car location, tire sensors for entry onto conveyor, truck bed sensors to detect and adjust wash program for trucks, send car sensors to activate the wash once the vehicle has safely transitioned onto the conveyor, and a tunnel control operating system interface to provide quick access at the point of loading for car wash personnel.

The system may also use audio queues to instruct a customer to stop, remove his/her foot from the vehicle's brake, and shift vehicle into neutral. Audio queues may be used to instruct a customer to wait for attendant if tunnel E-Stop is pressed. The system visually instructs customers to move left if their vehicle is too far to the right and move right if their vehicle is too far to the left. The system visually and audibly instructs customers to realign their vehicle if the vehicle is not aligned on the conveyor. The system may automatically send the car forward and start the car wash operation when the car is aligned properly.

The system cues drivers on proper spacing between vehicles as they enter and may prevent vehicles from colliding with one another. The system enables a faster, safer loading process. The system enables self-loading by customers to increase and enhance unattended loading for conveyor car washes.

Turning to the figures, FIG. 1 is a block diagram of a system of car wash tunnel entrance safety according to an embodiment of the present disclosure. FIG. 1 depicts components and interactions of a system 100 comprising a tunnel entrance safety system computer 102 and a tunnel entrance safety system application 104, which may be referred to hereinafter for brevity as the server 102 and the application 104, respectively. System 100 also comprises video cameras 106a-n, sensors 108a-n, an input/output device 110, a car wash control system 112, display screens 114, and audio speakers 116.

The application 104 executes at least partially on the server 102, which may comprise more than one physical device that may be physically situated at more than one geographic location. Portions of the application 104 may execute on two or more computers 102.

The application 104, in addition to performing central processing functionality of received data from cameras, sensors, and other components and for transmission of output comprising warnings and directives, also fully or partially comprises other software components that facilitate such functions such as signaling components and various application programming interfaces (API). Such components are discussed below in conjunction with additional figures.

System 100 also comprises video cameras 106a-n that are positioned at various locations throughout a car wash and particularly positioned to record video content of vehicles entering the car wash. The video cameras 106a-n may be directed to tires of vehicles as they begin to make contact with conveyor system equipment of car washes to assure that vehicles are aligned properly such that vehicles can be pulled and pushed into the car wash and do not become detached while in the car wash.

Video cameras 106a-n use computer vision to observe placement of tires against conveyor equipment and provide video material to the application 104 to assist in assuring that predetermined tolerances or complied with. As noted, tolerances may be measurements or distances that are predefined regarding tire distance from conveyor equipment. Tolerances are used in determining if a vehicle is becoming close to having an alignment problem such that remedial action may be required. Tolerances used may be a factor of vehicle size, shape, and weight, tire dimensions, and volume of vehicle traffic in a car wash at a given time.

Video cameras 106a-n are also used to identify potentially problematic vehicle characteristics as discussed above, for example optional equipment attached to exterior surfaces of vehicles. In addition to attached equipment, video cameras 106a-n may detect other problems such as that a vehicle's door is ajar or that a window is not completely closed and sealed.

Sensors 108a-n are attached to car wash equipment and other assets and assist in assuring that tolerances are not exceeded. Sensors 108a-n may also monitor performance of car wash equipment to measure performance and detect operating stress on such equipment. Excessive stress may arise from exceeding of tolerances by vehicles or from continued wear on components. As with video cameras 106a-n, sensors 108a-n transmit their captured data to the application 104 for processing. Sensors 108a-n may also provide their data to other components not related to the system 100 or the present disclosure.

The display screens 114 display messages for viewing by motorists and by car wash employees. The audio speakers 116 broadcast messages to the attention of motorists and car wash employees.

The input/output (I/O) device 110 receives instructions from the application 104 for the aforementioned remedial actions when a problem has been detected. The input/output device 110 then relays the instructions to components that control the car wash as well as signaling components. The application 104 may include a signal propagator application (not shown in FIG. 1) and at least one application programming interface (API) for interacting with the I/O device 110. The I/O device 110 may also transmit signals to messaging devices that provide warnings and instructions to customers in vehicles as well as car wash employees.

The car wash control system 112 receives instructions from the I/O device 110 regarding making adjustments to components of the car wash and shutting down all or part of the car wash when necessary. The control system 112 may be provided by third party vendors and may interact with components of the system 100 via at least APIs.

The display screens 114 display messages to motorists and employees. The audio speakers 116 broadcast messages to motorists and employees.

Figure 2:
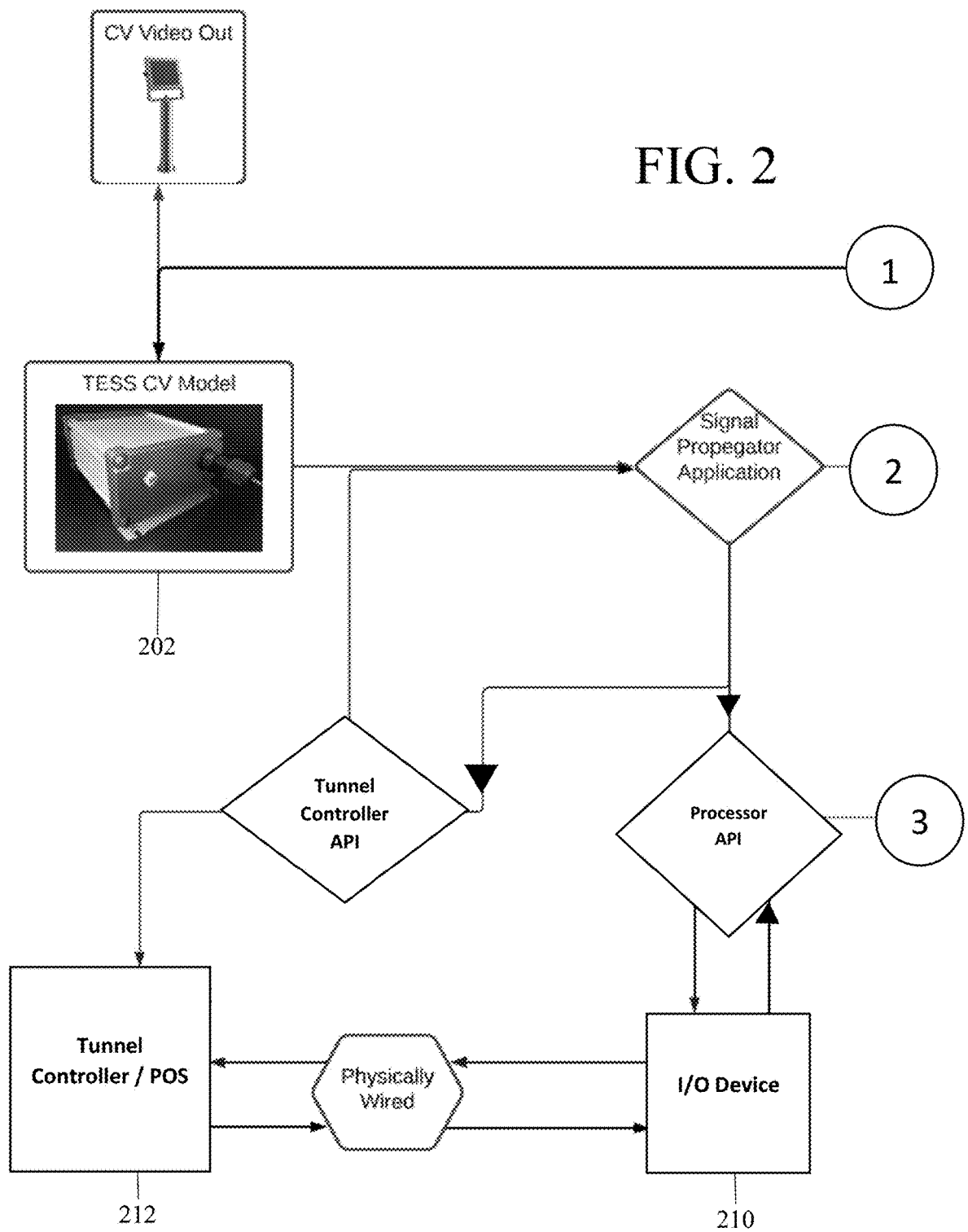
FIG. 2 is a diagram of a system of car wash tunnel safety according to an embodiment of the present disclosure.
Figure 3:
FIG. 3 through FIG. 10 are screenshot images generated by a system of car wash tunnel safety according to an embodiment of the present disclosure.
Figure 4:
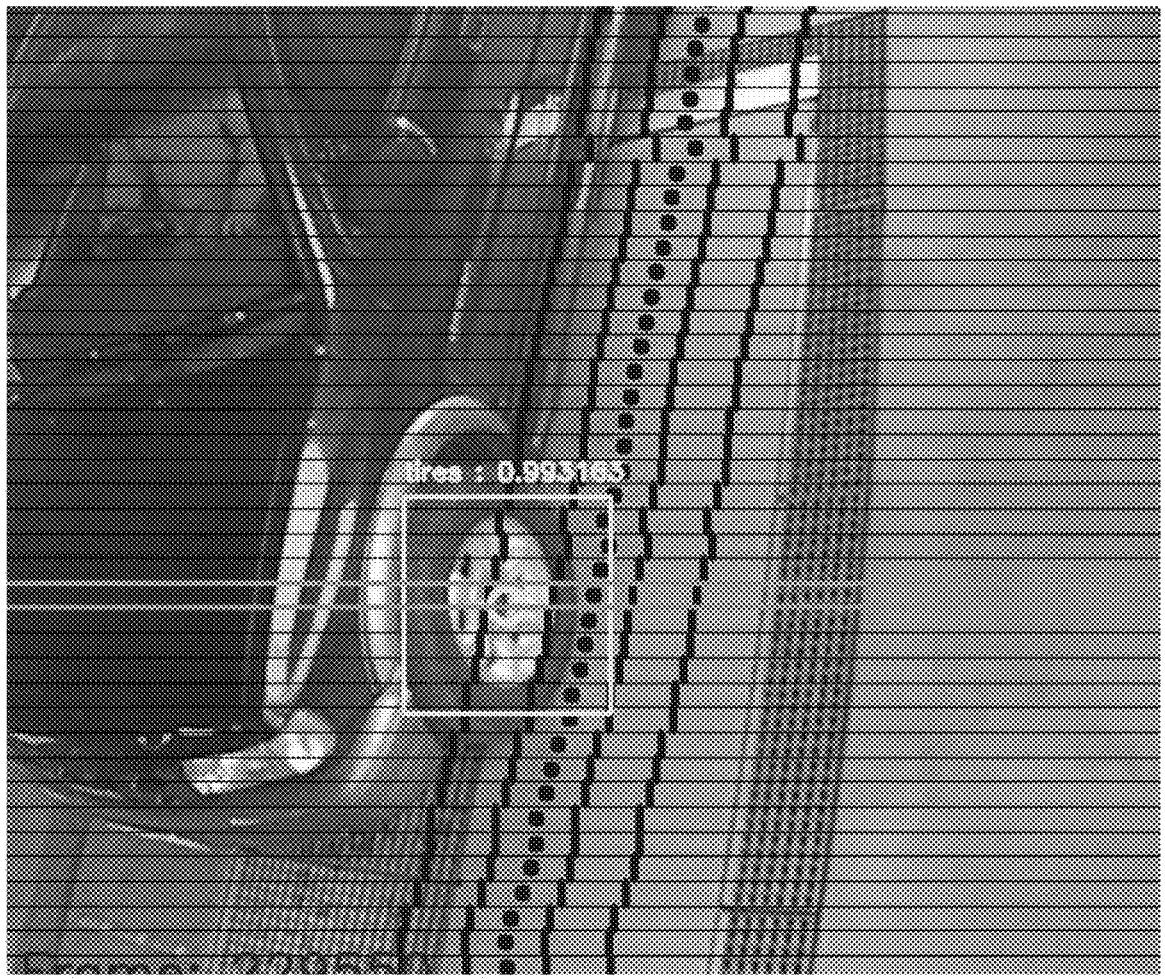
Figure 5:
Figure 6:
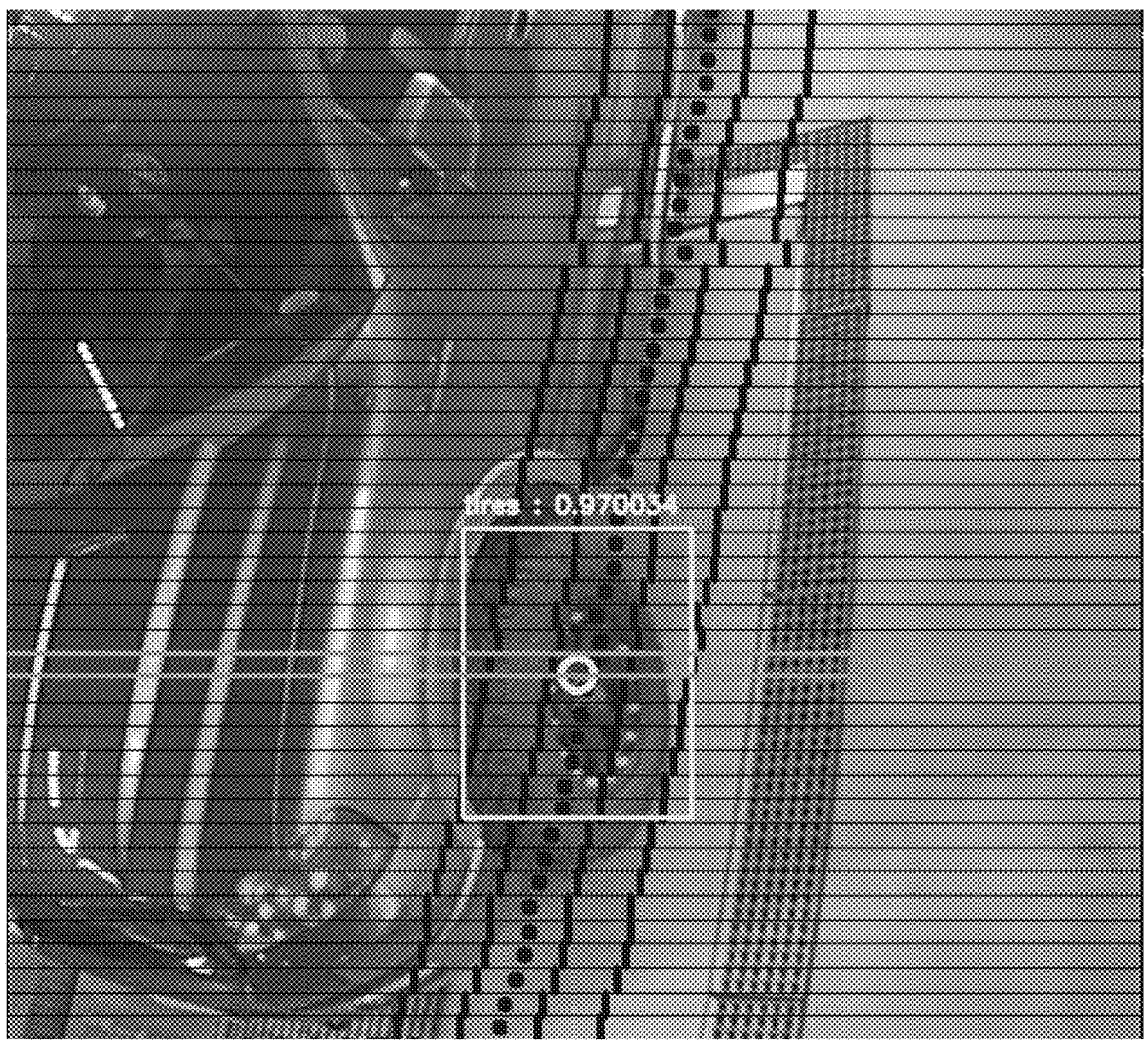
Figure 7:
Figure 8:
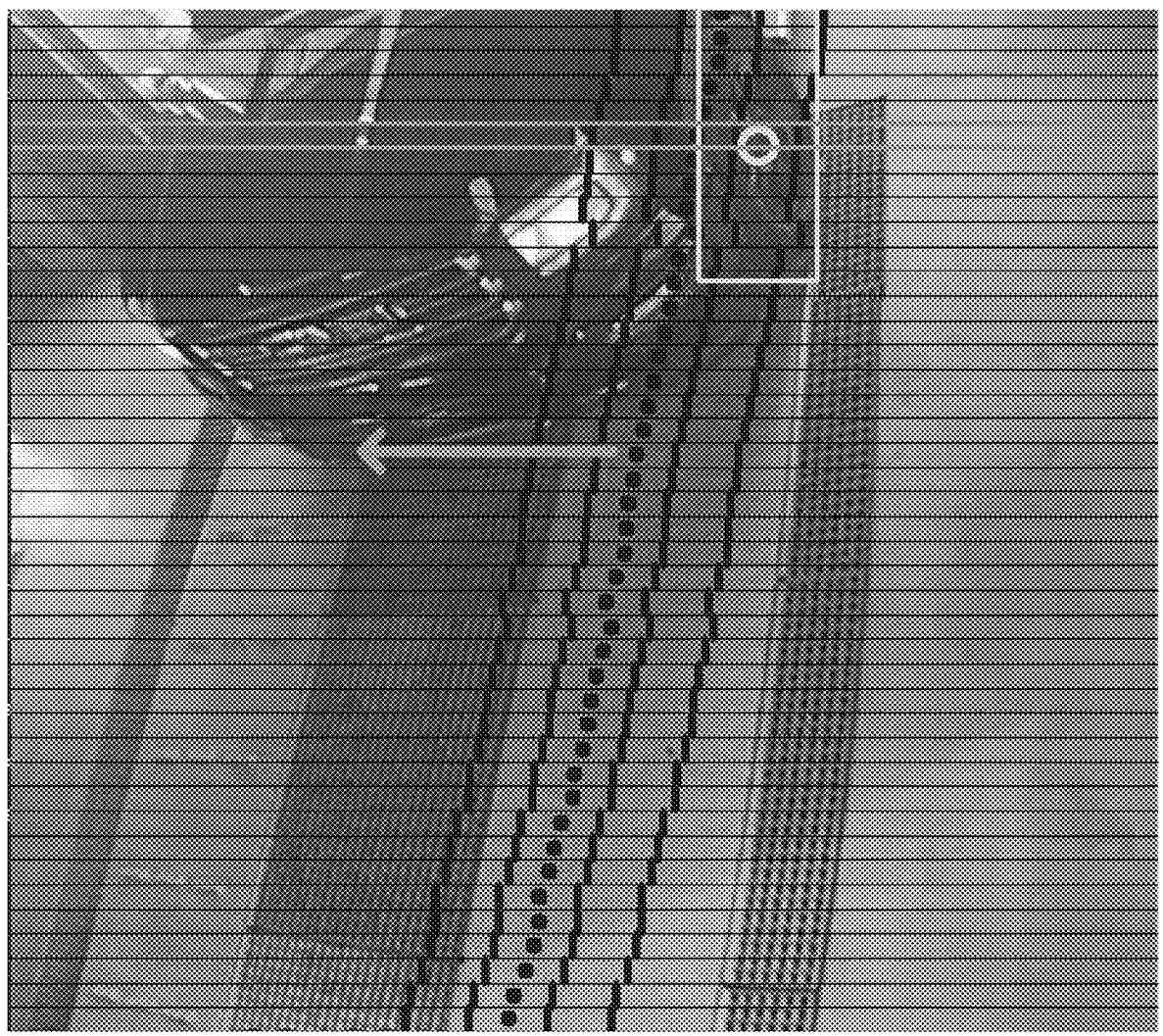
Figure 9:
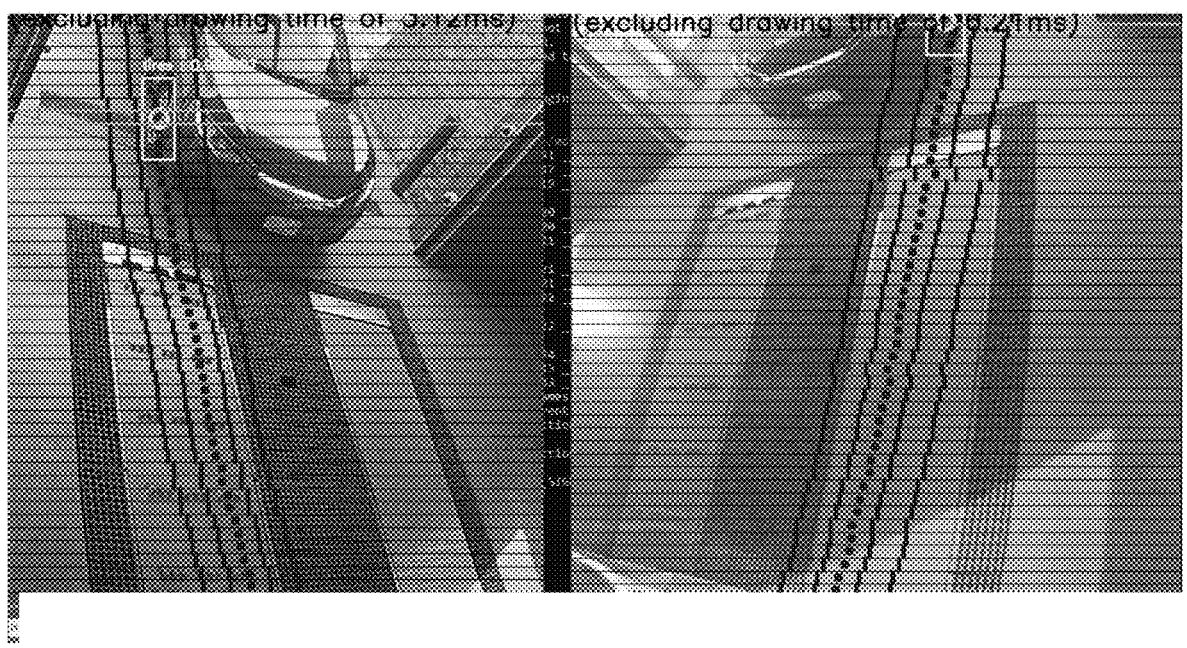
Figure 10:
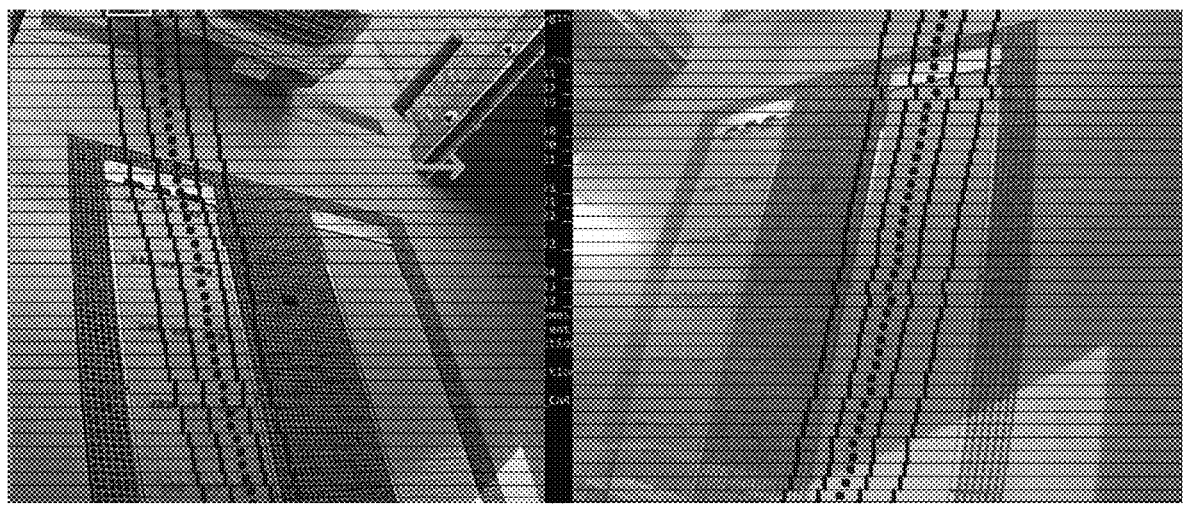

FIG. 2 and FIG. 2, cont. is a diagram of a system of car wash tunnel entrance safety according to an embodiment of the present disclosure. FIG. 2 depicts components and interactions of a system 200 with components of FIG. 2 indexed to components of FIG. 1. What is depicted as TESS CV Model 202 is equivalent to the server 102 and application 104 of the system 100.

The Tunnel Controller/POS 212 is equivalent to the car wash control system 112.

FIG. 3 through FIG. 10 depict images of vehicles entering a car wash and the processing operations performed on those images by the system. FIG. 3 through FIG. 10 may be screenshots of display images that an operator of the system may view. While systems and methods provided herein may be entirely or almost entirely automated, the application 104 provides for human intervention by an operator of the system. In an embodiment, the server 102 may be located in an office of a car wash. An operator may view the screens of which the depictions of FIG. 3 through FIG. 10 may be representative. The operator may intervene in some situations and override instructions sent by the system or may implement actions when necessary upon determining that the system has not detected a particular problem or risk situation. The operator may also initiate communications with car wash employees or customer through systems provided herein or other means.

In FIG. 3 through FIG. 10, horizontal lines are grid patterns. Action can be adjusted depending on how close a vehicle is to the front of the entrance on the grid. The dotted line is projected center of wheel. Two lines on each side of center are optimal location for wheel. If center goes one way or the other across the inner blue lines, the driver will be instructed to move left or right accordingly.

Farthest outside the lines are the outside tolerances for how far the wheel center can be away from the projected path before the conveyor will pause. The system detects wheels as they transition from solid ground to the moving car wash conveyor system. Direction and guidance begin about one car length before the vehicle transitions to the conveyor.

Figure 11:
FIG. 11 is an image of a display according to an embodiment of the present disclosure.
Figure 12:
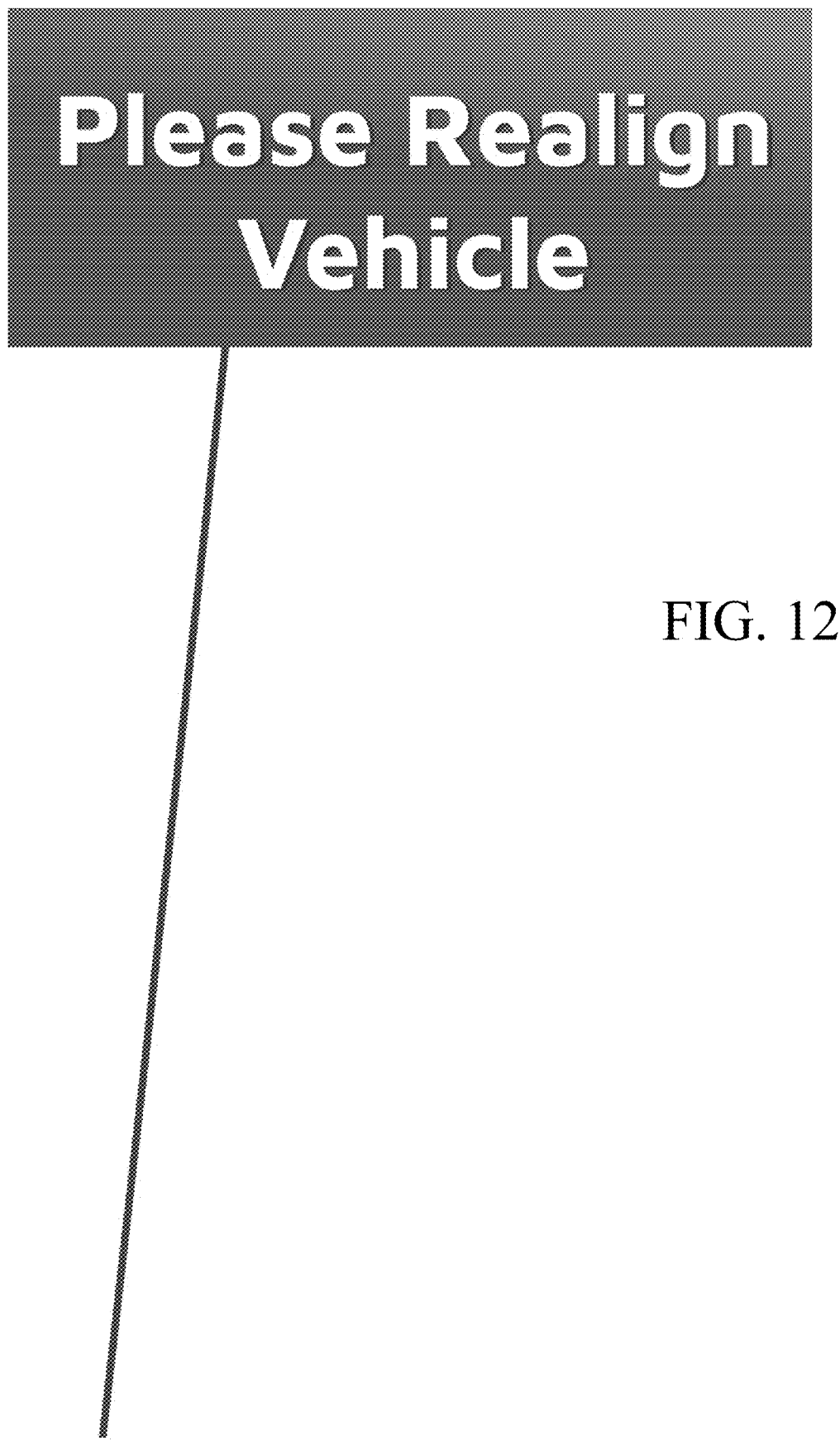
FIG. 12 is an image of a display according to an embodiment of the present disclosure.

FIG. 11 and FIG. 12 are examples of screens that may be displayed to motorists as they enter the car wash and need to be warned or redirected in some manner. As noted, drivers can be engaged in various ways. In embodiments, such screens may permit a car wash to employ fewer personnel in the entryway or on the line.

Figure 13:
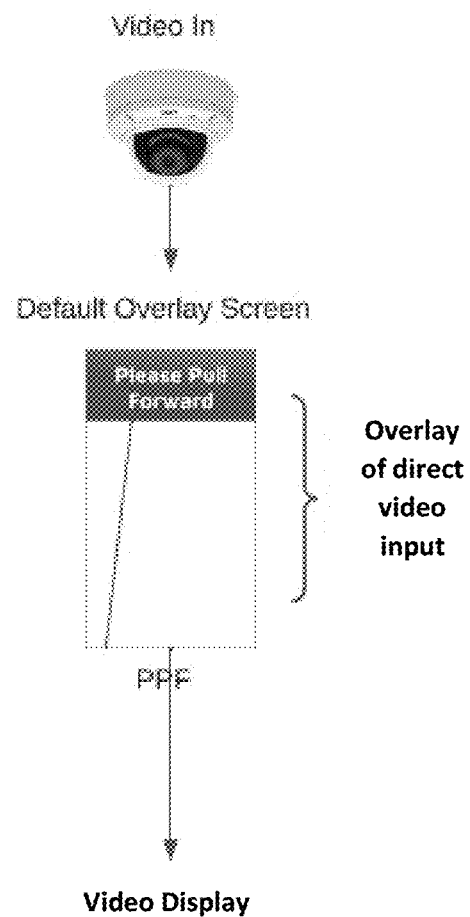
FIG. 13 is a diagram of a system of car wash tunnel safety according to an embodiment of the present disclosure.
Figure 13:
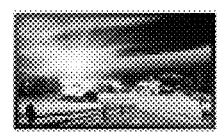
Figure 13:
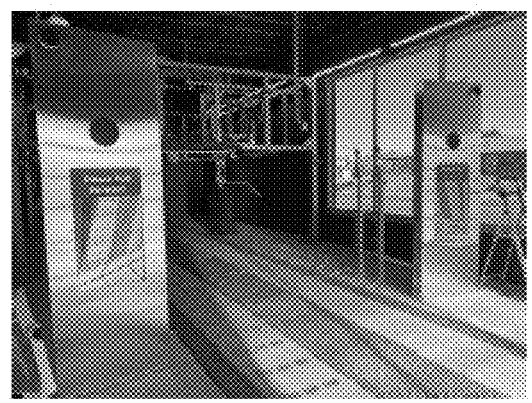

FIG. 13 depicts how video content is both captured and displayed. At the bottom of FIG. 13 is an image of an entry to a car wash as provided herein. When provided commercially as the Tunnel Entrance Safety System (TESS), video cameras 106a-n may be situated at least on metal panels on either side of a vehicle as it enters the car was as depicted in FIG. 13. The panels may be sleek and durable stainless-steel columns with IP65 rated displays for visual queuing and voice command that guide customers onto the conveyor. IP65 rated enclosures give protection against low pressure water jets from any direction, as well as condensation and water spray.

Figure 14:
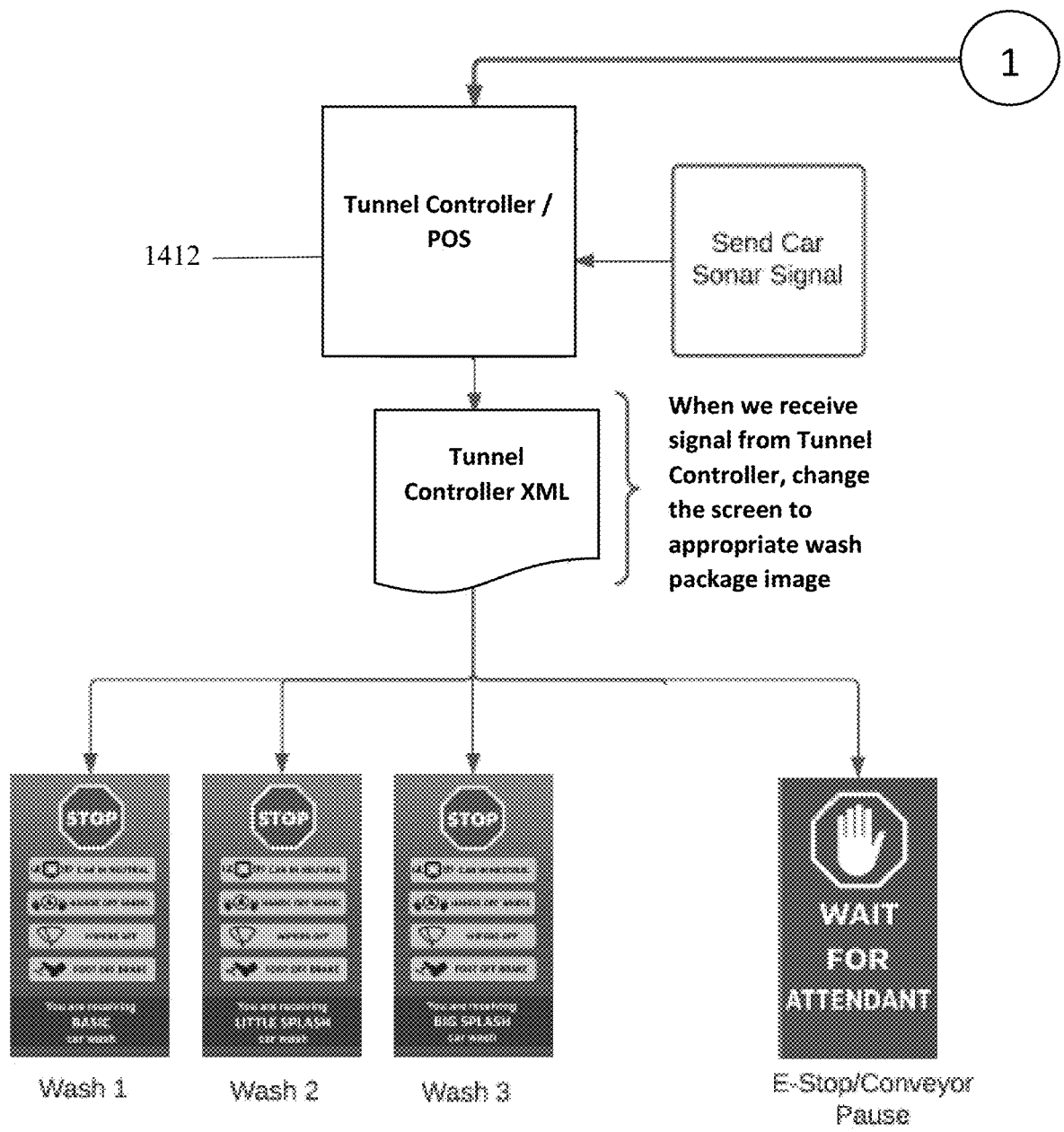
FIG. 14 is a diagram of a system of car wash tunnel safety according to an embodiment of the present disclosure.

FIG. 14 and FIG. 14, cont. together illustrate video capturing and messaging to motorists and others. The components of FIG. 14 and FIG. 14, cont. are indexed to the components of FIG. 1.

Figure 15:
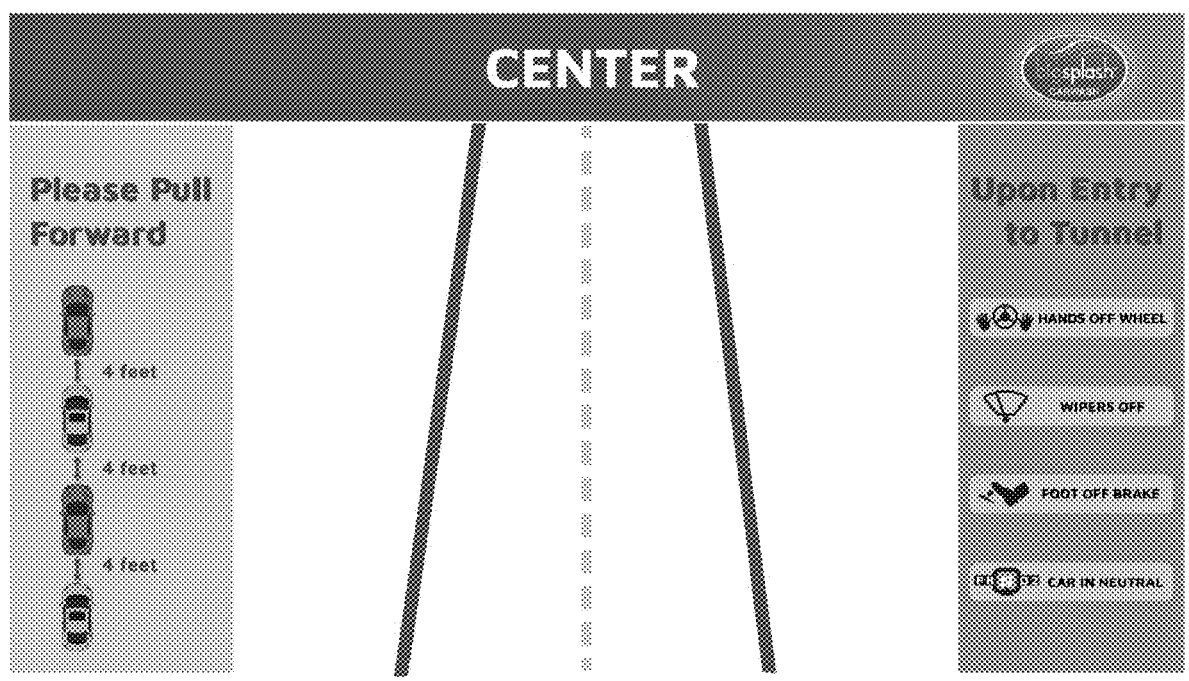
FIG. 15 is an image of a display according to an embodiment of the present disclosure.
Figure 16:
FIG. 16 is an image of a display according to an embodiment of the present disclosure.
Figure 17:
FIG. 17 is an image of a display according to an embodiment of the present disclosure.

The system also optionally comprises a Spotless Alignment Monitor (SAM) system that also observes vehicles as they enter the car wash to assure proper alignment and provides notifications to motorists. FIG. 15, FIG. 16, and FIG. 17 depict screens that may be displayed by the Spotless Alignment Monitor (SAM) system.

Figure 18:
FIG. 18 is a screenshot image generated by a system of car wash tunnel safety according to an embodiment of the present disclosure.

FIG. 18 is an image that may be captured by the SAM system. FIG. 18 is a portion of video content captured by computer vision of SAM trained on a vehicle to identify the vehicle's wheels. Identification and tracking continue into the car wash tunnel to ensure the wheel does not come off of the conveyor. Snapshots of the tire conveyor alignment are captured. Cameras on each of the pedestals capture the view of the car coming onto the conveyor from both sides. SAM is the exterior screen that handles the approach. Both components of the system 100 and SAM perform directional queuing but the system 100 provides audio queueing as well and ultimately has the connection with the car wash conveyor to shut it down if the tire comes off the track.

Figure 19:
FIG. 19 is an image of a display according to an embodiment of the present disclosure.

FIG. 19 is another depiction of the system 100 and SAM system working together. The two towers with red boxes around them are components of the system 100. The exterior screen overhead with the green box is the SAM screen.

Figure 20:
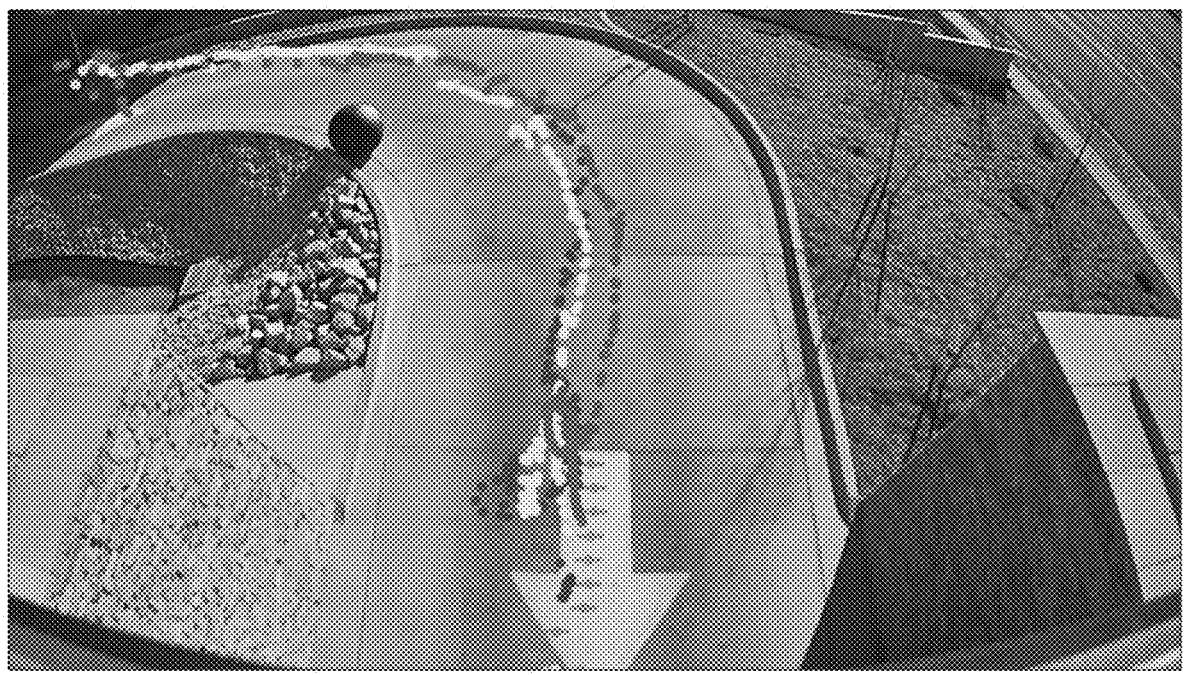
FIG. 20 is a screenshot image generated by a system of car wash tunnel safety according to an embodiment of the present disclosure.

FIG. 20 is an image that may be captured by the SAM system to track vehicle movement into a car wash. The dots that are projected in different colors for an operator's viewing indicate that the computer vision is tracking 'center line' for the vehicles as they come around the bend. If a vehicle is excessively out of alignment with the conveyor, the conveyor will be stopped upon approach.

In an embodiment, a system to promote car wash safety and protection of car wash assets is provided. The system comprises a server and an application executing on the server. The system receives content from a video camera, the camera capturing live video of vehicles entering a car wash. The system also performs a first analysis of at least tire alignment of a first vehicle with car wash conveyor equipment. The system also performs a second analysis of characteristics of the first vehicle, the characteristics comprising at least body shape and optional equipment attached to exterior surfaces of the first vehicle. The system also determines, based on the analyses, that at least one of a safety issue and a property damage issue is present. Based on the determination, the system also at least one of transmits an audible or visual message, transmits an instruction for adjustment of at least one car wash component, and transmits an instruction for one of full and partial shutdown of the car wash. The system transmits the instructions via an input/output device. The input/output device forwards the instructions to a car wash control system. Tire alignment and potential safety issues therewith are based on defined tolerances accessed by the system. The optional equipment comprises at least one of a trailer hitch, a bicycle rack, and a luggage rack. The adjustment of the at least one car wash component comprises at least one of temporarily moving the component, the adjustment necessitated by at least the second analysis. The system further comprises sensors located within and external to the car wash, the sensors providing data used in supporting the analyses.

In another embodiment, a method for promoting car wash safety and protection of car wash assets is provided. The method comprises a computer receiving video-sourced and sensor-sourced material from data capture components situated at a car wash. The method also comprises the computer determining, based at least on analysis of the material, that a safety threshold based at least on predetermined tolerances has been breached. The method also comprises the computer determining that at least one source of the breached threshold is misalignment of a first vehicle entering the car wash. The method also comprises the computer determining, based on a calculated severity of the misalignment, to at least one of transmit visual and audible warnings and shut down part or all of the car wash. The method also comprises the computer setting tolerances for at least alignment of tires of the first vehicle with conveyor components of the car wash. The method also comprises the computer configuring tolerances and thresholds based at least on sizes and shapes of vehicles, on tire dimensions, and on car wash conveyor equipment specifications. Data capture components that provide the video-sourced material comprise at least video cameras directed at vehicles entering the car wash. The method also comprises the computer transmitting the warnings via an input/output device. The method also comprises the input/output device forwarding the warnings to a car wash control system.

In yet another embodiment, a system for protecting car wash assets is provided. The system comprises a computer and an application executing on the computer. The system receives captured observation data regarding vehicles entering a car wash. The system also determines that a first observed vehicle includes at least one externally attached accessory. The system also determines, based at least on calculated dimensions of the first vehicle and of the accessory, that a first adjustment to current car wash configuration is necessary to prevent damage to car wash assets. The system also provides, via an input/output device, instructions to a car wash control system to implement the first adjustment. The externally attached accessory comprises at least one of a trailer hitch, a trailer hitch, a bicycle rack, and a luggage rack. The first adjustment comprises temporarily moving a car wash component to prevent damage to the component by the accessory. The observation data is captured by at least one of a video camera and a sensor located at the car wash. The system further detects objects in a bed of a truck, wherein the presence of the objects present a risk of damage to the car wash assets. When the system detects presence a trailer hitch on the first vehicle, the system instructs rear wrap components of the car wash to not engage fully. The system detects presence of a roof rack on the first vehicle, the system instructs the control system to retract a top brush component.

What is claimed is:

1. A system to promote car wash safety and protection of car wash assets, comprising:
    a server; and
    an application executing on the server that:
        receives content from a video camera, the camera capturing live video via at least computer vision of vehicles entering a car wash,
        performs a first analysis of at least tire alignment of a first vehicle with car wash conveyor equipment,
        performs a second analysis of characteristics of the first vehicle, the characteristics comprising at least body shape and optional equipment attached to exterior surfaces of the first vehicle,
        determines, based on the analyses, that at least one of a safety issue and a property damage issue is present, and
        based on the determination, at least one of transmits an audible or visual message, transmits an instruction for adjustment of at least one car wash component, and transmits an instruction for one of full and partial shutdown of the car wash.

2. The system of claim 1, wherein the system transmits the instructions via an input/output device.

3. The system of claim 2, wherein the input/output device forwards the instructions to a car wash control system.

4. The system of claim 1, wherein tire alignment and potential safety issues therewith are based on defined tolerances accessed by the system.

5. The system of claim 1, wherein the optional equipment comprises at least one of a trailer hitch, a bicycle rack, and a luggage rack.

6. The system of claim 1, wherein the adjustment of the at least one car wash component comprises at least one of temporarily moving the component, the adjustment necessitated by at least the second analysis.

7. The system of claim 1, wherein the system further comprises sensors located within and external to the car wash, the sensors providing data used in supporting the analyses.

8. A method for promoting car wash safety and protection of car wash assets, comprising:
    a computer receiving video-sourced and sensor-sourced material from data capture components situated at a car wash;
    the computer determining, based at least on analysis of the material, that a safety threshold based at least on predetermined tolerances has been breached;
    the computer determining that at least one source of the breached threshold is misalignment of a first vehicle entering the car wash;
    the computer determining, based on a calculated severity of the misalignment, to at least one of transmit visual and audible warnings and shut down part or all of the car wash.

9. The method of claim 8, further comprising the computer setting tolerances for at least alignment of tires of the first vehicle with conveyor components of the car wash.

10. The method of claim 8, further comprising the computer configuring tolerances and thresholds based at least on sizes and shapes of vehicles, on tire dimensions, and on car wash conveyor equipment specifications.

11. The method of claim 8, wherein data capture components that provide the video-sourced material comprise at least video cameras directed at vehicles entering the car wash.

12. The method of claim 8, further comprising the computer transmitting the warnings via an input/output device.

13. The method of claim 12, further comprising the input/output device forwarding the warnings to a car wash control system.

14. A system for protecting car wash assets, comprising:
    a computer;
    an application executing on the computer that:
        receives captured observation data regarding vehicles entering a car wash,
        determines that a first observed vehicle includes at least one externally attached accessory,
        determines, based at least on calculated dimensions of the first vehicle and of the accessory, that a first adjustment to current car wash configuration is necessary to prevent damage to car wash assets,
        provides, via an input/output device, instructions to a car wash control system to implement the first adjustment.

15. The system of claim 14, wherein the externally attached accessory comprises at least one of a trailer hitch, a bicycle rack, and a luggage rack.

16. The system of claim 14, wherein the first adjustment comprises temporarily moving a car wash component to prevent damage to the component by the accessory.

17. The system of claim 14, wherein the observation data is captured by at least one of a video camera and a sensor located at the car wash.

18. The system of claim 17, wherein the video camera uses computer vision to capture the observation data.

19. The system of claim 14, wherein when the system detects presence a trailer hitch on the first vehicle, the system instructs rear wrap components of the car wash to not engage fully.

20. The system of claim 4, wherein when the system detects presence of a roof rack on the first vehicle, the system instructs the control system to retract a top brush component.

* * * * *